United States Patent
Liu

(10) Patent No.: US 12,169,913 B2
(45) Date of Patent: Dec. 17, 2024

(54) METHOD AND SYSTEM FOR A HIGH-FREQUENCY ATTENTION NETWORK FOR EFFICIENT SINGLE IMAGE SUPER-RESOLUTION

(71) Applicant: Lemon Inc., Grand Cayman (KY)

(72) Inventor: Ding Liu, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 389 days.

(21) Appl. No.: 17/669,072

(22) Filed: Feb. 10, 2022

(65) Prior Publication Data

US 2023/0252605 A1    Aug. 10, 2023

(51) Int. Cl.
- G06K 9/00 (2022.01)
- G06T 5/20 (2006.01)
- G06T 5/50 (2006.01)
- G06T 5/70 (2024.01)

(52) U.S. Cl.
CPC .......... G06T 5/70 (2024.01); G06T 5/20 (2013.01); G06T 5/50 (2013.01); *G06T 2207/20016* (2013.01); *G06T 2207/20024* (2013.01); *G06T 2207/20081* (2013.01); *G06T 2207/20084* (2013.01)

(58) Field of Classification Search
CPC .... G06T 5/70; G06T 5/20; G06T 5/50; G06T 2207/20016; G06T 2207/20024; G06T 2207/20081; G06T 2207/20084
See application file for complete search history.

(56) References Cited

U.S. PATENT DOCUMENTS

| 11,967,066 B2 * | 4/2024 | Park | G06T 11/008 |
| 2023/0177643 A1 * | 6/2023 | Yang | G06T 3/4053 382/156 |

FOREIGN PATENT DOCUMENTS

| CN | 111192200 A | 5/2020 |
| CN | 111986092 A | 11/2020 |
| CN | 113344786 A | 9/2021 |
| CN | 113837935 A | 12/2021 |

OTHER PUBLICATIONS

Frequency separation-based multi-scale cascading residual block network for image super resolution, Zhenbing Liu et al., Springer, Jan. 18, 2022, pp. 6827-6848 (Year: 2022).*

(Continued)

*Primary Examiner* — Jayesh A Patel
(74) *Attorney, Agent, or Firm* — Astute IP Law Group

(57) ABSTRACT

Example aspects include techniques for implementing a high-frequency attention network for single image super-resolution. These techniques may include extracting a plurality of features from an original image input into a CNN to generate a feature map, and restoring one or more high-frequency details of the original image via an efficient residual block (ERB) and a high-frequency attention block (HFAB) configured to assign a scaling factor to one or more high-frequency areas. In addition, the techniques may include generating reconstruction input information by performing an element-wise operation on the one or more high-frequency details and cross-connection information from the feature map and performing, by the CNN, an enhancement operation on the reconstruction input information to generate an enhanced image.

17 Claims, 5 Drawing Sheets

(56) References Cited

OTHER PUBLICATIONS

Hybrid Residual Attention Network for Single Image Super Resolution, Abdul Muqeet et al, arXiv, Jul. 2019, pp. 1-12 (Year: 2019).*
Multi-scale attention network for image super-resolution, Li Wang et al., ELSEVIER, 2021, pp. 1-12 (Year: 2021).*
Residual Attention Network for Wavelet Domain Super-Resolution, Jing Liu et al.,ICASSP, 2020, pp. 2033-2037 (Year: 2020).*
International Search Report in PCT/SG2023/050058, mailed Aug. 17, 2023, 4 pages.
Zhang et al., "Image Super-Resolution Using Very Deep Residual Channel Attention Networks," Proceedings of European Conference on Computer Vision (ECCV) 2018, Sep. 14, 2018, pp. 294-310.

* cited by examiner

METHOD AND SYSTEM FOR A HIGH-FREQUENCY ATTENTION NETWORK FOR EFFICIENT SINGLE IMAGE SUPER-RESOLUTION

BACKGROUND

In some instances, due to the limitation of imaging hardware equipment or the influence of imaging conditions, an attribute of a captured image may be insufficient, e.g., the resolution of the image may be below a preferred threshold. Improving the imaging accuracy of hardware devices can increase the cost of the product and also cannot completely address imaging conditions. Single image super-resolution (SISR) is a low level vision problem, with the purpose of recovering a high-resolution (HR) image according to its degraded low resolution (LR) counterpart. SISR has high practical value in many fields such as video, photography, games, and medical imaging.

To solve this highly ill-posed problem, different kinds of methods have been proposed. In recent years, convolutional neural network (CNN) based SISR models have become prevalent for their strong capability in recovering or generating image high-frequency details. However, most existing SISR models tend to employ very deep and complicated network topology for reproducing more details. As a result, the required heavy computational cost and memory consumption make it difficult to deploy these SISR models in many real world applications with resource-limited edge and mobile devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a method may include performing, on an original image input into a CNN, a feature extraction operation to generate a feature map, and restoring one or more high-frequency details of the original image via an efficient residual block (ERB) and a high-frequency attention block (HFAB) configured to assign a scaling factor to one or more high-frequency areas of the feature map. Further, the method may include generating reconstruction input information by performing an element-wise operation on the one or more high-frequency details and cross-connection information from the feature map and performing, by the CNN, an enhancement operation on the reconstruction input information to generate an enhanced image.

In another aspect, a device may include a memory storing instructions, and at least one processor coupled with the memory and to execute the instructions to: extract a plurality of features from an original image input into a CNN to generate a feature map; perform, via an efficient residual block (ERB) and a high-frequency attention block (HFAB) configured to assign a scaling factor to one or more high-frequency areas, a detail learning operation on the feature map to restore one or more high-frequency details of the original image; generate reconstruction input information by performing an element-wise operation on the high-frequency details and cross-connection information from the feature map; and perform, by the CNN, an enhancement operation on the reconstruction input information to generate an enhanced image.

In another aspect, an example computer-readable medium (e.g., non-transitory computer-readable medium) storing instructions for performing the methods described herein and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

Neural networks have been utilized in super resolution processes and showed great improvement in the reconstruction quality. To gain better results, the SISR models become deeper and deeper by stacking convolutional layers. Although increasing the depth of the models spatially can improve the performance of super resolution quality, increasing the depth of the models has also resulted in high computation and memory consumption. As a result, the super resolution models cannot be easily utilized for real-world applications. Further, it is even more challenging to design light-weight and efficient SISR models for mobile devices due to the very limited hardware resources on mobile devices, e.g., fairly lower bandwidth and computing capacity compared to those of a graphical processing unit (GPU) server.

This disclosure describes techniques for implementing a high-frequency attention network (HFAN) for single image super-resolution. In particular, aspects of the present disclosure provide a CNN including an ERB and HFB for performing single image super-resolution to recover high-frequency details of an image. The ERB 116 may provide deep feature learning and the HFAB may provide feature enhancement, both of which not only reduce memory consumption but also accelerate inference. Accordingly, the HFAN accelerates inference speed and reduce memory consumption by employing optimized serial network operations and boosting feature representations via attention mechanism.

Illustrative Environment

Figure 1:
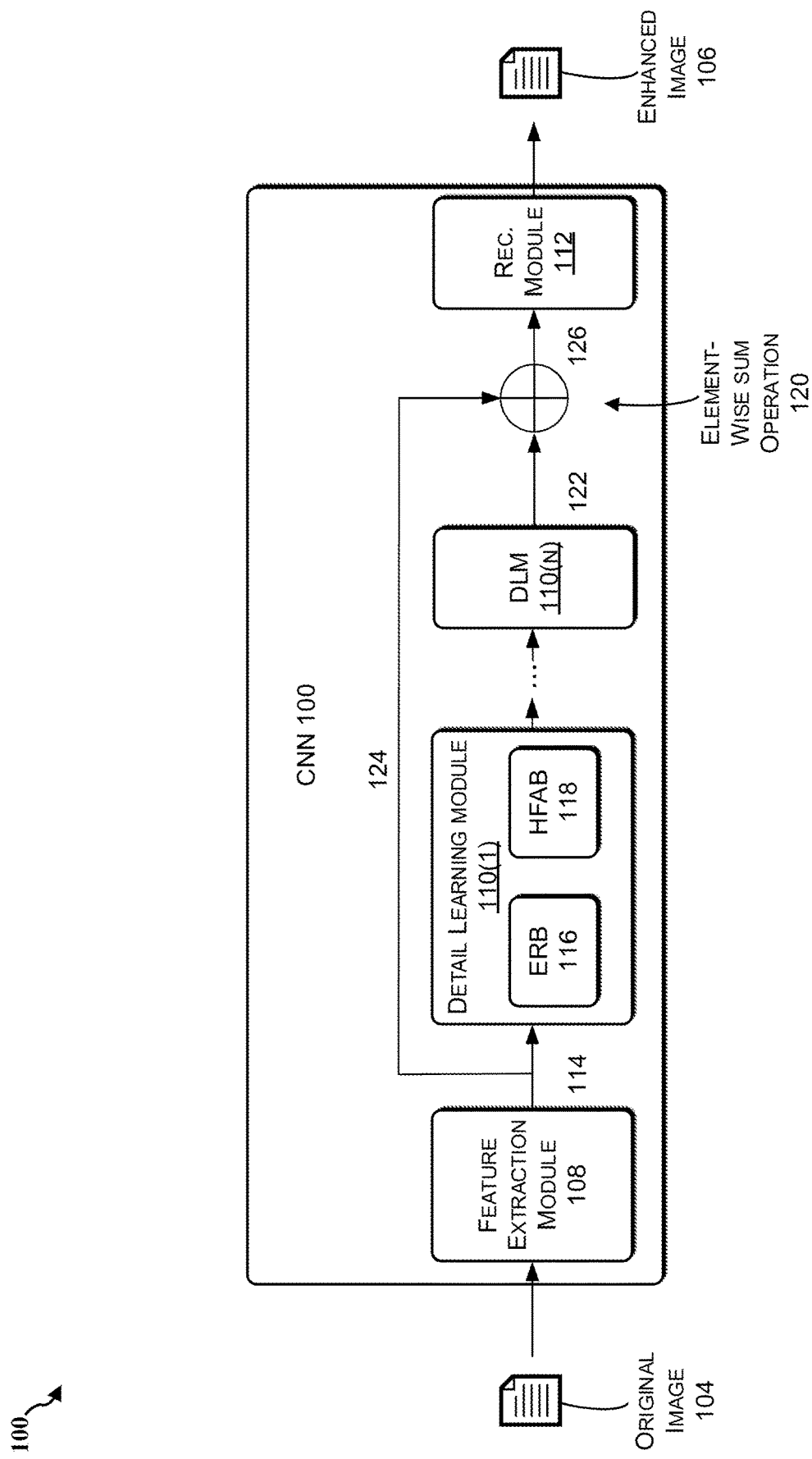
FIG. 1 illustrates a first example architecture of a CNN, in accordance with some aspects of the present disclosure.

FIG. 1 illustrates a first example architecture of a CNN 100, in accordance with some aspects of the present disclosure. In some aspects, a "neural network" may refer to a mathematical structure taking an object as input and producing another object as output through a set of linear and non-linear operations called layers. Such structures may have parameters which may be tuned through a learning phase so as to produce a particular output, and are, for instance, used for image enhancement. The input may then be the image to enhance, and the output may be an estimation of at least a part of the enhanced characteristics of the input image. Further, a "convolutional neural network" may refer to a neural network which is partly composed of convolutional layers, i.e., layers which apply a convolution on their input. In some aspects, as used herein, a "convolution" may refer to a linear operation that involves the multiplication of a set of weights with the input, much like a traditional neural network. Additionally, in some aspects, the multiplication may be performed between an array of input data and a two-dimensional array of weights, called a filter or a kernel. In some examples, each filter may be a collection of kernels, with there being one kernel for every single input channel to the layer, and each kernel being unique.

CNNs are most commonly applied to analyzing visual imagery. Unlike a standard neural network, layers of a CNN are arranged in a 3D volume in three dimensions: width, height, and depth (where depth refers to the third dimension of the volume, such as the number of channels in an image or the number of filters in a layer). Examples of the different layers of a CNN may include one or more convolutional layers, non-linear operator layers (such as rectified linear units (ReLU) functions, sigmoid functions, or hyperbolic tangent functions), pooling or subsampling layers, fully connected layers, and/or final loss layers. Each layer may connect one upstream layer and one downstream layer. The input may be considered as an input layer, and the output may be considered as the final output layer.

In some aspects, the CNN 100 may be configured to execute an image enhancement process on a device 102. For instance, an original image 104 may be input into the CNN 100, and the CNN 100 may output an enhanced image 106. In some aspects, the CNN 100 may be configured to perform SISR. Accordingly, the original image 104 may be a low resolution image and the enhanced image 106 may be a high resolution image. In another aspect, the CNN 100 may be configured to perform an image denoising process. As such, the original image 104 may be a noisy image, and the enhanced image 106 may be a denoised image. In yet still another aspect, the CNN 100 may be configured to perform an image demosaicing process. As such, the original image 104 may be an incomplete image, and the enhanced image 106 may be a complete image. Some examples of the device 102 include computing devices, smartphone devices, Internet of Things (IoT) devices, drones, robots, process automation equipment, sensors, control devices, vehicles, transportation equipment, tactile interaction equipment, virtual and augmented reality (VR and AR) devices, industrial machines, virtual machines, etc. In some examples, the device 102 may be a resource limited device (e.g., mobile device, edge device, etc.) having less computational resources and/or memory resources than a server device (e.g., a graphical processing unit (GPU) server) designed and configured to perform expensive machine learning operations. Further, the device 102 may be employed for at least one of live-streaming medical image analysis, remote sensing, real-time zooming, interactive editing, display-based upscaling, etc.

As illustrated in FIG. 1, the CNN 100 may include a feature extraction module 108, a plurality of detail learning modules (DLMs) 110(1)-(n), and a reconstruction module 112. The feature extraction module 108 (e.g., a convolutional layer) may be configured to perform feature extraction on input data corresponding to the original image 104 to generate a feature map 114. In some aspects, the input data may be a tensor with a shape defined by: the input height multiplied by the input width multiplied by the number of input channels. Further, the feature extraction module 108 may abstract the original image 104 to the feature map 114 with a shape defined by the feature map height multiplied by the feature map width multiplied by the number of feature map channels. As used herein, a "tensor" may refer to a generalization of vectors and matrices to potentially higher dimensions. In some aspects, a tensor may be a data structure organized as an array of numbers. The tensor may be characterized by a degree or order of the tensor. A zeroth-order tensor is a scalar, a first-order tensor is a vector (i.e., a one-dimensional array), a second-order tensor is a two-dimensional array, and so forth. Each dimension of the tensor can have a different respective number of elements or values.

The detail learning modules 110(1)-(n) may be configured to restore lost high-frequency details (e.g., edges, textures). As illustrated in FIG. 1, each detail learning module 110 may include at least one efficient residual block (ERB) 116 and at least one high-frequency attention block (HFAB) 118. In some aspects, the CNN 100 may include fifteen ERBs 116(1)-(15) and five HFABs 118(1)-(5). In some other aspects, the CNN 100 may include five ERB 116-HFAB 118 pairs. As described in detail herein, in order to accelerate inference speed and reduce memory consumption, the backbone of CNN is designed to employ highly optimized serial network operations instead of feature aggregation and boost feature representations via attention mechanism.

As described in detail herein, the ERB 116 may provide deep feature learning and the HFAB 118 may provide feature enhancement, both of which not only reduce memory consumption but also accelerate inference. The ERB 116 may be a skip-connection block that learns residual functions with reference to the layer inputs, instead of learning unreferenced functions. Further, to inherit the benefits of residual learning without introducing computational and/or memory cost associated with traditional residue blocks, the ERB 116 may employ two short skip connections that act as linear transformation in the ERB 116 so they can be re-parameterized into the parallel convolutional layer during inference.

In some aspects, the HFAB 118 may be configured to learn an attention map with special focus on the high-frequency regions. In addition, the HFAB 118 may include at least one learnable edge detector at the head to coarsely detect high-frequency regions. Further, the HFAB 118 may be configured to assign a scaling factor to every pixel with the high-frequency regions being assigned larger values since the high-frequency regions determine the performance of a SISR process.

As illustrated in FIG. 1, the DLMs 110(1)-(n) may be deployed serially with the output of a first DLM 110(1) being the input to the next DLM 110(2), and so forth. In some aspects, the CNN 100 may include five DLMs 110(1)-(5) connected in series. Further, the CNN 100 may perform an element-wise sum operation 120 using the output 122 of the last DLM 110(n) and cross connection information 124 of the feature map 114 to determine reconstruction input information 126.

The reconstruction module 112 may be configured to generate the enhanced image 106 based on the reconstruction input information 126 received from the DLM 110(n). For example, the reconstruction module 112 may be configured to learn an array of filters to upscale the reconstruction input information 126 (i.e., the final feature maps of the original image 104) into the enhanced image 106. As described in detail with respect to FIG. 1, in some aspects, the reconstruction module 112 may include at least a pixel shuffler (e.g., efficient sub-pixel convolutional layer), which learns the array of filters to upscale the reconstruction input information 126 into the enhanced image 106.

Figure 2:
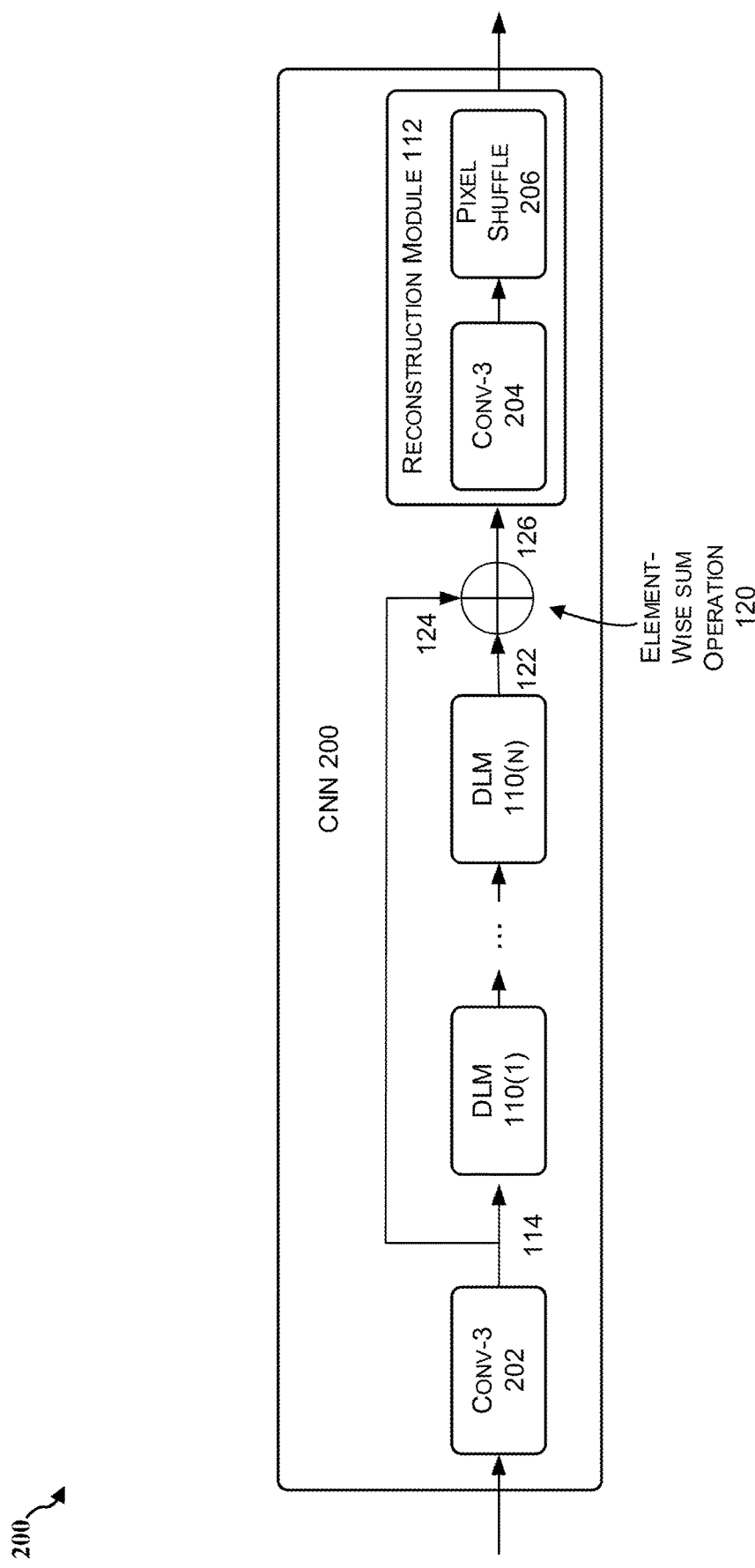
FIG. 2 illustrates a second example architecture of a CNN, in accordance with some aspects of the present disclosure.

FIG. 2 illustrates a second example architecture of a CNN 200 (e.g., the CNN 100), in accordance with some aspects of the present disclosure. As illustrated in FIG. 2, in some aspects, the CNN 200 may include a first 3×3 convolutional layer 202, the plurality of detail learning modules 110(1)-(n), a second 3×3 convolutional layer 204, and a pixel shuffle layer 206.

The first 3×3 convolutional layer 202 is a convolutional layer with a 3×3 filter to extract features from the original image 104. Further, the 3×3 kernel size may be used over other kernel sizes to reduce computational cost and reduce inference speed, especially when employing the CNN 200 on a resource limited device. Additionally, as described with respect to FIG. 1, the first 3×3 convolutional layer 202 may generate the feature map 114, which is provided to the DLMs 110(1)-(5) configured to restore lost high-frequency details (e.g., edges, textures) of an original image 104.

As illustrated in FIG. 2, the second 3×3 convolutional layer 204 and the pixel shuffle layer 206 may be configured to implement the reconstruction module 112. For example, the second 3×3 convolutional layer and the pixel shuffle layer 206 may be configured to perform an upsampling operation based on a final feature map (i.e., the reconstruction input information 126) to generate the enhanced image 106. As used herein, in some aspects, the pixel shuffle layer may reorganize the low-resolution image channels to obtain a larger image with fewer channels. For example, the pixel shuffle layer 206 may rearrange the elements of an input tensor expressed as H×W×C $r^2$ to form a tensor expressed as rH×rW×C, where r is an enhancement ratio. In some aspects, this may be very useful after a convolutional process, in which the number of filters drastically increase the number of channels, to invert the transformation like a sort of deconvolutional function.

In some aspects, the CNN 200 may be trained in a supervised training process. For example, a loss (regression) function may be used in the training process for the output of the enhanced image 106. Further, the loss function may measure the quality of a particular set of parameters based on how well the induced scores agreed with the ground truth labels in the training data. The loss function may be a mean square error, mean square logarithmic error, mean absolute error (L1), mean absolute percentage error, least square errors (L2), etc. In other words, the CNN 200 may learn to extract features from an image that minimize the loss for the specific task the CNN 200 is being trained to solve, e.g., extracting features that are the most useful for SISR.

In the training phase, the values of the filters of the first 3×3 convolutional layer 202 and the second 3×3 convolutional layer 204 may be learned. For example, with respect to the first 3×3 convolutional layer 202, the CNN 200 may learn the high-frequency details to extract from the original image 104. In some examples, the training set may include a plurality of image pairs. Each pair may include a first image (e.g., an image having a lower resolution) and a second image (e.g., an image having a higher resolution). Further, the first image may be generated by applying a downsampling operation to the second image. Additionally, the CNN 200 may be trained by learning the filters for the first 3×3 convolutional layer 202 and the second 3×3 convolutional layer 204 that cause the CNN 200 to substantially reproduce the second image of each pair from the first image of each pair.

Figure 3:
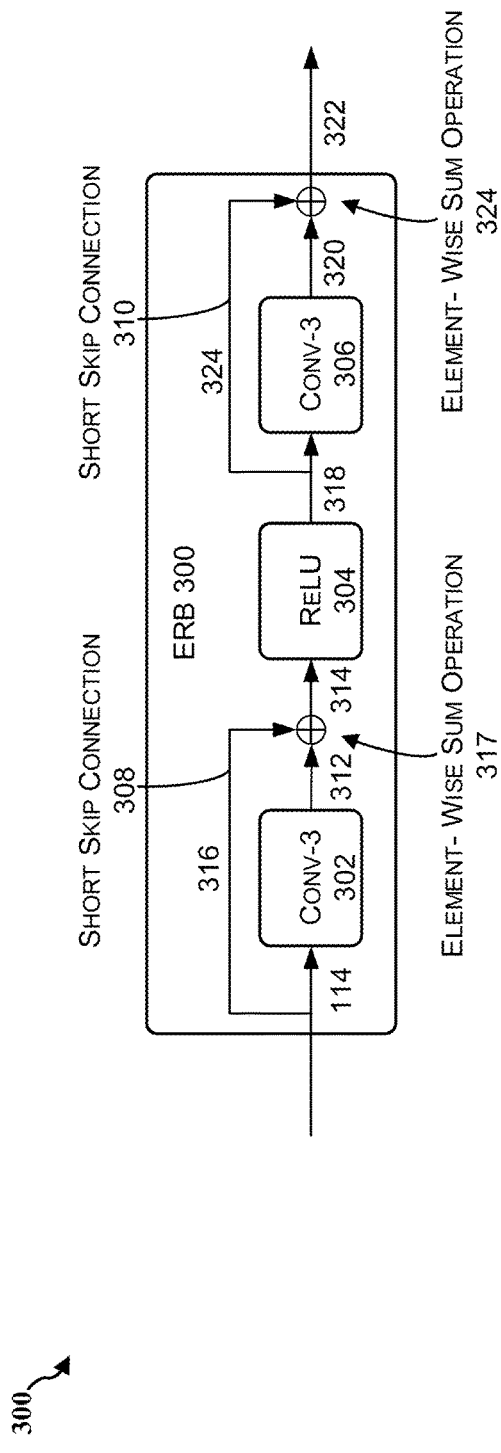
FIG. 3 illustrates an example architecture of an ERB, in accordance with some aspects of the present disclosure.

FIG. 3 illustrates an example architecture of an ERB 300 (e.g., the ERB 116), in accordance with some aspects of the present disclosure. As described herein, the ERB 300 may provide residual learning while reducing memory consumption and accelerating inference. As illustrated in FIG. 3, the ERB 300 may include a first 3×3 convolutional layer 302, a ReLU 304, and a second 3×3 convolutional layer 306. In some aspects, the ReLU 304 may be a piecewise linear function that outputs the input directly if the input is positive, and outputs zero if the input is not positive. Further, the ERB 300 may include short skip connections (e.g., the two short skip connections 308-310) that act as a linear transformation in the ERB 300. As illustrated in FIG. 3, the first 3×3 convolutional layer 302 of the ERB 300 may receive the feature map 114, and output first layer output information 312 based on one or more filters of the first 3×3 convolutional layer 302. In addition, the ERB 300 may determine an element-wise sum 314 of the first layer output information 312 and skip connection information 316 of the feature map 114 via an element-wise sum operation 317, and input the element-wise sum 314 into the ReLU 304 to determine second layer output information 318. Additionally, the second layer output information 318 may be input into the second 3×3 convolutional layer 306 to determine third layer output information 320 based on one or more filters of the second 3×3 convolutional layer 306. Further, the ERB 300 may determine an element-wise sum 322 of the third layer output information 320 and skip connection information 324 of the second layer output information 318 via an element-wise sum operation 326, and output the element-wise sum 322 to a HFAB.

In some aspects, the short skip connections 308-310 may provide an alternative path for the gradient to flow without interruption during backpropagation or provide semantic features with high resolutions by bridging features of finer details from lower layers and high-level semantic features of coarse resolutions. In addition, the filters of the first 3×3 convolutional layer 302, and the filters of the second 3×3 convolutional layer 306 may be determined during the training phase. Additionally, the first 3×3 convolutional layer 302 and the second 3×3 convolutional layer 306 may be configured to perform feature transformation in the CNN (e.g., the CNN 100 or CNN 200). In some instances, the ERB 300 may implement structural re-parameterization to improve super resolution performance. For example, the skip connections 308-310 may be employed to capture the benefits of multi-branch architecture in the training phase. Further, the skip connections 308-310 may be removed during the inference phase, thereby transforming the parameters of the convolutional layers 302 and 306 as the removal of the skip connections 308-310 modifies the architecture of the CNN.

Figure 4:
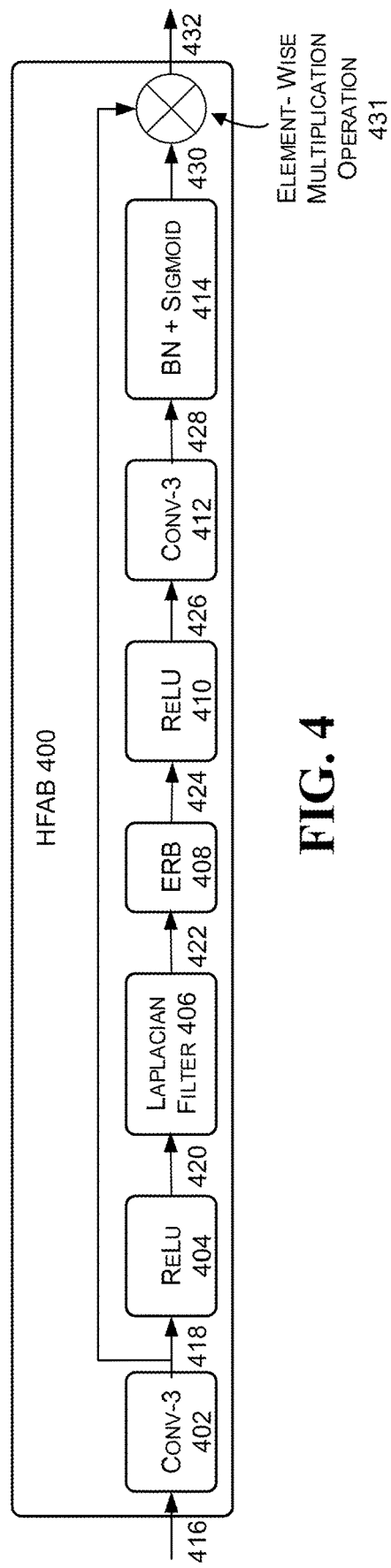
FIG. 4 illustrates an example architecture of a HFAB, in accordance with some aspects of the present disclosure.

FIG. 4 illustrates an example architecture of a HFAB 400, in accordance with some aspects of the present disclosure. As described herein, the HFAB 400 may restore lost details by assigning a scaling factor to every pixel with the high-frequency regions having higher scaling factors. As illustrated in FIG. 4, the ERB may include a first 3×3 convolutional layer 402, a ReLU 404, a Laplacian filter 406, an ERB 408, a ReLU 410, a second 3×3 convolutional layer 412, and a batch normalization (BN)/sigmoid layer 414.

The first 3×3 convolutional layer 402 may receive ERB output information 416 from an ERB in the same details learning module as the HFAB 400. Further, the first 3×3 convolutional layer 402 may be configured to reduce the channel dimension of the ERB output information 416 for efficiency purposes and generate the first layer output information 418. In some aspects, the first 3×3 convolutional layer 402 may be configured to reduce the channel dimension of the ERB output information 416 to sixteen. Further, the ReLU 404 may receive the first layer output information and apply a ReLU function to determine the second layer output information 420. Additionally, the Laplacian filter 406 may receive the second layer output information 420 and detect the frequency details within the second layer output information 420 as the third layer output information 422. In some aspects, the Laplacian filter 406 may implemented by a depth-wise convolution. In some other aspects, another type of layer may be used to detect the frequency details.

The ERB 408 may receive the third layer output information 422 and transmit the fourth layer output information 424 to subsequent layers (e.g., the ReLU 410) within the HFAB 400. Further, the ReLU 410 may apply a ReLU function to the fourth layer output information 424 to generate the fifth layer output information 426.

In addition, the second 3×3 convolutional layer 412 may be configured to expand the dimension of the fifth layer output information 426 as the sixth layer output information 428, and provide the sixth layer output information 428 to the BN/Sigmoid layer 414. The BN component of the BN/Sigmoid layer 414 may be used to normalize the activations of the sixth layer output information 428 within the BN/Sigmoid layer 414 before passing it into the next layer in the CNN. In some aspects, batch normalization reduces the effects of varying input distribution. By standardizing the output of neurons, batch normalization may restrain variation towards saturable regions. Further, by placing the BN/Sigmoid layer 414 after the ReLU 410, positive valued features are normalized without statistically biasing them with features that would have otherwise not been provided downstream to the next convolutional layer. Additionally, the sigmoid function of the BN/Sigmoid layer 414 may be used as an activation function in the HFAB 400. In particular, the sigmoid function may restrict the values of the seventh layer output information 430 generated by the BN/Sigmoid layer 414 to values between 0 and 1.

Further, the HFAB 400 may recalibrate the input features (i.e., the ERB output information 416) by performing an element-wise multiplication 431 of the input features (i.e., the ERB output information 416) by the attention map (i.e., the seventh layer output information 430). Additionally, the recalibrated input features 432 may be provided to another HFAB in a series of HFABs of a CNN or added to a feature map in an element-wise addition before being input to a reconstruction module (e.g., the provision of the reconstruction input information 126 to the reconstruction module 112).

In the training phase, a CNN may be configured to learn the filters of the first 3×3 convolutional layer 402 and the second 3×3 convolutional layer 412 configured to reduce and expand dimension, respectively. Further, during the training phase, the CNN may be configured to learn the weights of the Laplacian filter 406 configured to detect high-frequency details. In addition, in the inference phase, the skip connection of ERB 408 inside the HFAB 400 and the BN layer 414 are removed and the corresponding parameters are merged into related convolutional layers, so the HFAB 400 only contains four highly optimized operators: 3×3 convolution, ReLU, sigmoid and element-wise multiplication, and avoids complex multi-branch topology, which ensures faster inference.

Example Processes

The processes described in FIG. 5 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the CNN 100. By way of example and not limitation, the method 500 is described in the context of FIGS. 1-4 and 6. For example, the operations may be performed by one or more of the CNN 100, the CNN 200, the ERB 116, the ERB 300, the ERB 408, the HFAB 118, and/or the HFAB 400. Further, although FIGS. 1-4 illustrate the use of a 3×3 convolution for the CNN 100, the CNN 200, the ERB 116, the ERB 300, the ERB 408, the HFAB 118, and/or the HFAB 400, another kernel size may be used for at least one of the convolutional layers in some other examples.

Figure 5:
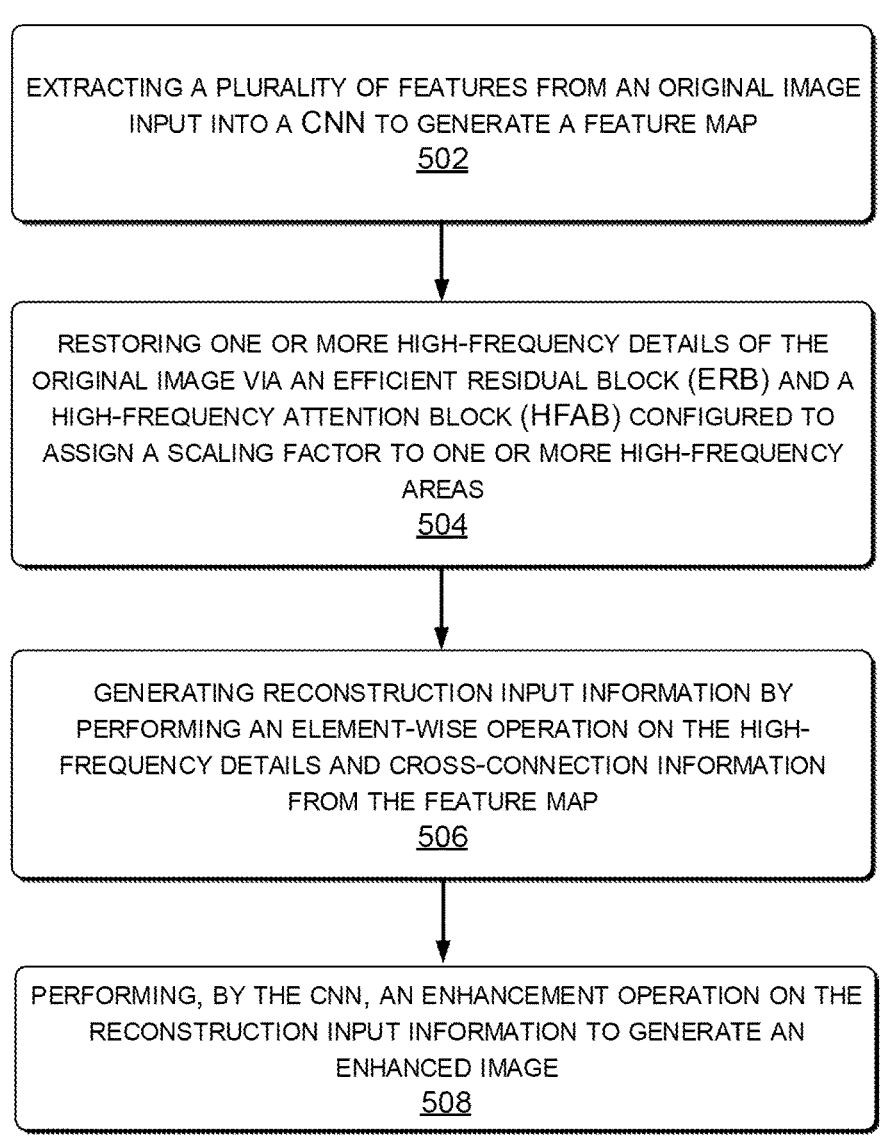
FIG. 5 is a flow diagram illustrating an example method for employing a high-frequency attention network (HFAN) for single image super-resolution, in accordance with some aspects of the present disclosure.

FIG. 5 is a flow diagram illustrating an example method for employing a high-frequency attention network (HFAN) for single image super-resolution, in accordance with some aspects of the present disclosure.

At block 502, the method 500 may include extracting a plurality of features from an original image input into a CNN to generate a feature map. For example, the feature extraction module 108 may extract a plurality of features from an original image input into a CNN to generate a feature map 114. In some aspects, the feature extraction module 108 may include a 3×3 convolutional layer 202 configured to extract the feature map 114.

Accordingly, the device 102, the computing device 600, and/or the processor 601 executing the CNN 100, the CNN 200, the feature extraction module, and/or the 3×3 convolutional layer 202 may provide means extracting a plurality of features from an original image input into a CNN to generate a feature map based on the original image 104.

At block 504, the method 500 may include restoring one or more high-frequency details of the original image via an efficient residual block (ERB) and a high-frequency attention block (HFAB) configured to assign a scaling factor to one or more high-frequency areas of the feature map. For example, the detail learning modules 110(1)-(n) may restore one or more high-frequency details of the original image based on a plurality of ERBs 116 and a plurality of HFABs 118.

Accordingly, the device 102, the computing device 600, and/or the processor 601 executing the CNN 100 the CNN 200, and/or the detail learning modules 110(1)-(n) may provide means for restoring one or more high-frequency details of the original image via an efficient residual block (ERB) and a high-frequency attention block (HFAB) configured to assign a scaling factor to one or more high-frequency areas of the feature map.

At block 506, the method 500 may include generating reconstruction input information by performing an element-wise operation on the one or more high-frequency details and cross-connection information from the feature map. For example, the CNN 100 may generate the reconstruction input information 126 based on performing an element-wise addition of the recalibrated input features and the feature map 114.

Accordingly, the device 102, the computing device 600, and/or the processor 601 executing the CNN 100 or the CNN 200 may provide means for generating reconstruction input information by performing an element-wise operation on the one or more high-frequency details and cross-connection information from the feature map.

At block 508, the method 500 may include performing, by the CNN, an enhancement operation on the reconstruction input information to generate an enhanced image. For example, the reconstruction module 112 may generate the enhanced image 106 based on the reconstruction input information 126. In some aspects, the reconstruction module 112 may employ the 3×3 convolutional layer 204 and pixel shuffle layer 206 to generate the enhanced image 106. As described herein, in some aspects, the CNN 100 and/or the CNN 200 may be configured to perform SISR, denoising, and/or demosaicing as the enhancement operation. Accordingly, the original image 104 may be a low resolution image, and the enhanced image 106 generated by the reconstruction module 112 may be a high resolution image. In some other aspects, the CNN 100 and/or the CNN 200 may be configured to perform denoising or demosaicing. Further, the reconstruction module 112 may not employ the pixel shuffle layer 206 when performing demising or demosaicing.

Accordingly, the device 102, the computing device 600, and/or the processor 601 executing the CNN 100, the CNN 200, and/or the reconstruction module 112 may provide means for performing, by the CNN, an enhancement operation on the reconstruction input information to generate an enhanced image.

While the operations are described as being implemented by one or more computing devices, in other examples various systems of computing devices may be employed. For instance, a system of multiple devices may be used to perform any of the operations noted above in conjunction with each other.

Illustrative Computing Device

Figure 6:
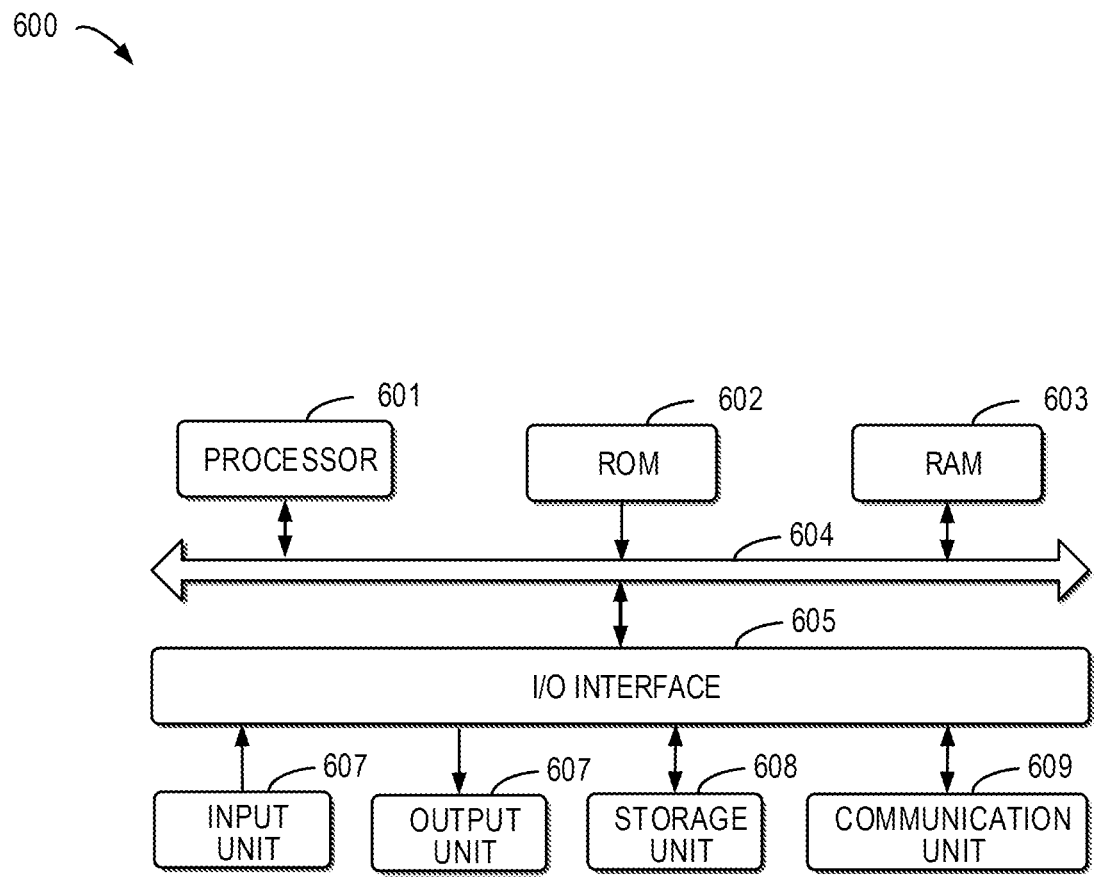
FIG. 6 is a block diagram illustrating an example of a hardware implementation for a computing device(s), in accordance with some aspects of the present disclosure.

FIG. 6 illustrates a block diagram of an example computing system/device 600 (e.g., device 102) suitable for implementing example embodiments of the present disclosure. The CNN 100 or the CNN 200 may be implemented as or included in the system/device 600. The system/device 600 may be a general-purpose computer, a physical computing device, or a portable electronic device, or may be practiced in distributed cloud computing environments where tasks are performed by remote processing devices that are linked through a communication network. The system/device 600 can be used to implement any of the processes described herein.

As depicted, the system/device 600 includes a processor 601 which is capable of performing various processes according to a program stored in a read only memory (ROM) 602 or a program loaded from a storage unit 608 to a random access memory (RAM) 603. In the RAM 603, data required when the processor 601 performs the various processes or the like is also stored as required. The processor 601, the ROM 602 and the RAM 603 are connected to one another via a bus 604. An input/output (I/O) interface 605 is also connected to the bus 604.

The processor 601 may be of any type suitable to the local technical network and may include one or more of the following: general purpose computers, special purpose computers, microprocessors, digital signal processors (DSPs), graphic processing unit (GPU), co-processors, and processors based on multicore processor architecture, as non-limiting examples. The system/device 600 may have multiple processors, such as an application-specific integrated circuit chip that is slaved in time to a clock which synchronizes the main processor.

A plurality of components in the system/device 600 are connected to the I/O interface 605, including an input unit 606, such as a keyboard, a mouse, or the like; an output unit 607 including a display such as a cathode ray tube (CRT), a liquid crystal display (LCD), or the like, and a loud-speaker or the like; the storage unit 608, such as disk and optical disk, and the like; and a communication unit 609, such as a network card, a modem, a wireless transceiver, or the like. The communication unit 609 allows the system/device 600 to exchange information/data with other devices via a communication network, such as the Internet, various telecommunication networks, and/or the like.

The methods and processes described above, such as the method 500, can also be performed by the processor 601. In some embodiments, the method 500 can be implemented as a computer software program or a computer program product tangibly included in the computer readable medium, e.g., storage unit 608. In some embodiments, the computer program can be partially or fully loaded and/or embodied to the system/device 600 via ROM 602 and/or communication unit 609. The computer program includes computer executable instructions that are executed by the associated processor 601. When the computer program is loaded to RAM 603 and executed by the processor 601, one or more acts of the method 500 described above can be implemented. Alternatively, processor 601 can be configured via any other suitable manners (e.g., by means of firmware) to execute the method 500 in other embodiments.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A single image reconstruction method comprising:
extracting a plurality of features from an original image input into a CNN to generate a feature map;
restoring one or more high-frequency details of the original image via an efficient residual block (ERB) and a high-frequency attention block (HFAB) configured to assign a scaling factor to one or more high-frequency areas, wherein restoring one or more high-frequency details further comprises:
reducing, by a first 3×3 convolutional layer of the HFAB, the feature map from a first channel dimension to a second channel dimension to generate first layer output information;
detecting, via a Laplacian filter of the HFAB, second layer output information including the one or more high-frequency details of the original image based on the first layer output information;
expanding, by a second 3×3 convolutional layer of the HFAB, the second layer output information from the second channel dimension to the first channel dimension to generate third layer output information;
performing a sigmoid operation on the third layer output information to determine fourth layer output information; and
performing an element-wise multiplication of the feature map and the fourth layer output information to determine HFAB output used to determine reconstruction input information;
generating the reconstruction input information by performing an element-wise operation on the one or more high-frequency details and cross-connection information from the feature map; and
performing, by the CNN, an enhancement operation on the reconstruction input information to generate an enhanced image.

2. The single image reconstruction method of claim 1, further comprising training the ERB and the HFAB in a supervised learning process using L1 loss and a plurality of image pairs, wherein each image pair includes a first image of a lower quality and a second image of a higher quality.

3. The single image reconstruction method of claim 1, wherein extracting the plurality of features comprises generating the feature map using a 3×3 convolutional layer.

4. The single image reconstruction method of claim 1, wherein the ERB includes two short skip connections that are re-parameterized into a parallel convolutional layer during an inference phase.

5. The single image reconstruction method of claim 1, wherein performing the enhancement operation on the reconstruction input information to generate the enhanced image comprises:
performing, via 3×3 convolutional layer and a pixel shuffle layer, the enhancement operation on the reconstruction input information to generate the enhanced image.

6. The single image reconstruction method of claim 1, wherein the original image is a lower resolution image and the enhanced image is a higher resolution image.

7. The single image reconstruction method of claim 1, wherein the original image is a noisy image and the enhanced image is a denoised image.

8. A non-transitory computer-readable device having instructions thereon that, when executed by at least one computing device, causes the at least one computing device to perform operations comprising:
extracting a plurality of features from an original image input into a CNN to generate a feature map;
restoring one or more high-frequency details of the original image via an efficient residual block (ERB) and a high-frequency attention block (HFAB) configured to assign a scaling factor to one or more high-frequency areas of the feature map, wherein restoring one or more high-frequency details further comprises:
reducing, by a first 3×3 convolutional layer of the HFAB, the feature map from a first channel dimension to a second channel dimension to generate first layer output information;
detecting, via a Laplacian filter of the HFAB, second layer output information including the one or more high-frequency details of the original image based on the first layer output information;
expanding, by a second 3×3 convolutional layer of the HFAB, the second layer output information from the second channel dimension to the first channel dimension to generate third layer output information;
performing a sigmoid operation on the third layer output information to determine fourth layer output information; and
performing an element-wise multiplication of the feature map and the fourth layer output information to determine HFAB output used to determine reconstruction input information;
generating the reconstruction input information by performing an element-wise operation on the one or more high-frequency details and cross-connection information from the feature map; and
performing, by the CNN, an enhancement operation on the reconstruction input information to generate an enhanced image.

9. The non-transitory computer-readable device of claim 8, the operations further comprising training the ERB and the HFAB in a supervised learning process using L1 loss and a plurality of image pairs, wherein each image pair includes a first image of a lower quality and a second image of a higher quality.

10. The non-transitory computer-readable device of claim 8, wherein extracting the plurality of features comprises generating the feature map using a 3×3 convolutional layer.

11. The non-transitory computer-readable device of claim 8, wherein the ERB includes two short skip connections that are re-parameterized into a parallel convolutional layer during an inference phase.

12. The non-transitory computer-readable device of claim 8, wherein performing the enhancement operation on the reconstruction input information to generate the enhanced image comprises:
performing, via 3×3 convolutional layer and a pixel shuffle layer, the enhancement operation on the reconstruction input information to generate the enhanced image.

13. The non-transitory computer-readable device of claim 8, wherein the original image is a lower resolution image and the enhanced image is a higher resolution image.

14. The non-transitory computer-readable device of claim 8, wherein the original image is a noisy image and the enhanced image is a denoised image.

15. A system comprising:

a memory storing instructions thereon; and at least one processor coupled with the memory and configured by the instructions to:

extract a plurality of features from an original image input into a CNN to generate a feature map;

restore one or more high-frequency details of the original image via an efficient residual block (ERB) and a high-frequency attention block (HFAB) configured to assign a scaling factor to one or more high-frequency areas of the feature map, wherein restoring one or more high-frequency details further comprises:

reducing, by a first 3×3 convolutional layer of the HFAB, the feature map from a first channel dimension to a second channel dimension to generate first layer output information;

detecting, via a Laplacian filter of the HFAB, second layer output information including the one or more high-frequency details of the original image based on the first layer output information;

expanding, by a second 3×3 convolutional layer of the HFAB, the second layer output information from the second channel dimension to the first channel dimension to generate third layer output information;

performing a sigmoid operation on the third layer output information to determine fourth layer output information; and performing an element-wise multiplication of the feature map and the fourth layer output information to determine HFAB output used to determine reconstruction input information;

generate the reconstruction input information by performing an element-wise operation on the one or more high-frequency details and cross-connection information from the feature map; and perform, by the CNN, an enhancement operation on the reconstruction input information to generate an enhanced image.

16. The system of claim 15, wherein the at least one processor is further configured by the instructions to:

Train the ERB and the HFAB in a supervised learning process using L1 loss and a plurality of image pairs, wherein each image pair includes a first image of a lower quality and a second image of a higher quality.

17. The system of claim 15, wherein the ERB includes two short skip connections that are re-parameterized into a parallel convolutional layer during an inference phase.

* * * * *